(12) United States Patent
Kitano et al.

(10) Patent No.: US 11,031,226 B2
(45) Date of Patent: Jun. 8, 2021

(54) MASS SPECTROMETER AND MASS SPECTROMETRY

(71) Applicant: SHIMADZU CORPORATION, Kyoto (JP)

(72) Inventors: Riki Kitano, Kyoto (JP); Kazuhiro Kawamura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/753,436

(22) PCT Filed: Oct. 25, 2017

(86) PCT No.: PCT/JP2017/038459
§ 371 (c)(1),
(2) Date: Apr. 3, 2020

(87) PCT Pub. No.: WO2019/082294
PCT Pub. Date: May 2, 2019

(65) Prior Publication Data
US 2020/0321207 A1 Oct. 8, 2020

(51) Int. Cl.
*H01J 49/00* (2006.01)
*H01J 49/06* (2006.01)
*G01N 30/72* (2006.01)
*H01J 49/10* (2006.01)
*H01J 49/42* (2006.01)

(52) U.S. Cl.
CPC ........ *H01J 49/067* (2013.01); *G01N 30/7206* (2013.01); *H01J 49/10* (2013.01); *H01J 49/4215* (2013.01)

(58) Field of Classification Search
CPC ...... H01J 49/067; H01J 49/10; H01J 49/4215; G01N 30/7206; G01N 30/72; G01N 27/62
USPC ................... 250/281, 282, 396 R, 396 ML
See application file for complete search history.

(56) References Cited

U.S. PATENT DOCUMENTS 8,866,077 B2 * 10/2014 Okumura .............. H01J 49/067
250/293
2005/0211892 A1 9/2005 Shimomura

FOREIGN PATENT DOCUMENTS

JP 2005-274352 A 10/2005

OTHER PUBLICATIONS

International Search Report for PCT/JP2017/038459 dated Jan. 16, 2018 [PCT/ISA/210].

(Continued)

*Primary Examiner* — Michael Maskell
(74) *Attorney, Agent, or Firm* — Sughrue Mion, PLLC

(57) ABSTRACT

Provided is a mass spectrometric method including steps of transporting ions generated in an ion source 2 to a mass spectrometer section 4 through an ion optical system 3 having a plurality of ion lenses 31, 32 and 33, and detecting the ions after performing mass separation of the ions. The method further includes steps of: adjusting a voltage applied to a first ion lens 33 which is one of the ion lenses 31, 32 and 33 so that the detection sensitivity for an ion having a predetermined mass-to-charge ratio satisfies a previously specified requirement; and applying, to a second ion lens 32 which is one of the ion lenses 31, 32 and 33 except the first ion lens 33, a voltage at which a change in the ion detection sensitivity with respect to the voltage applied to the second ion lens 33 is within a previously specified range.

5 Claims, 6 Drawing Sheets

(56) References Cited

OTHER PUBLICATIONS

Written Opinion for PCT/JP2017/038459 dated Jan. 16, 2018 [PCT/ISA/237].

* cited by examiner

STANDARD MASS SPECTRUM

MASS SPECTRUM IN CONVENTIONAL AUTOTUNING

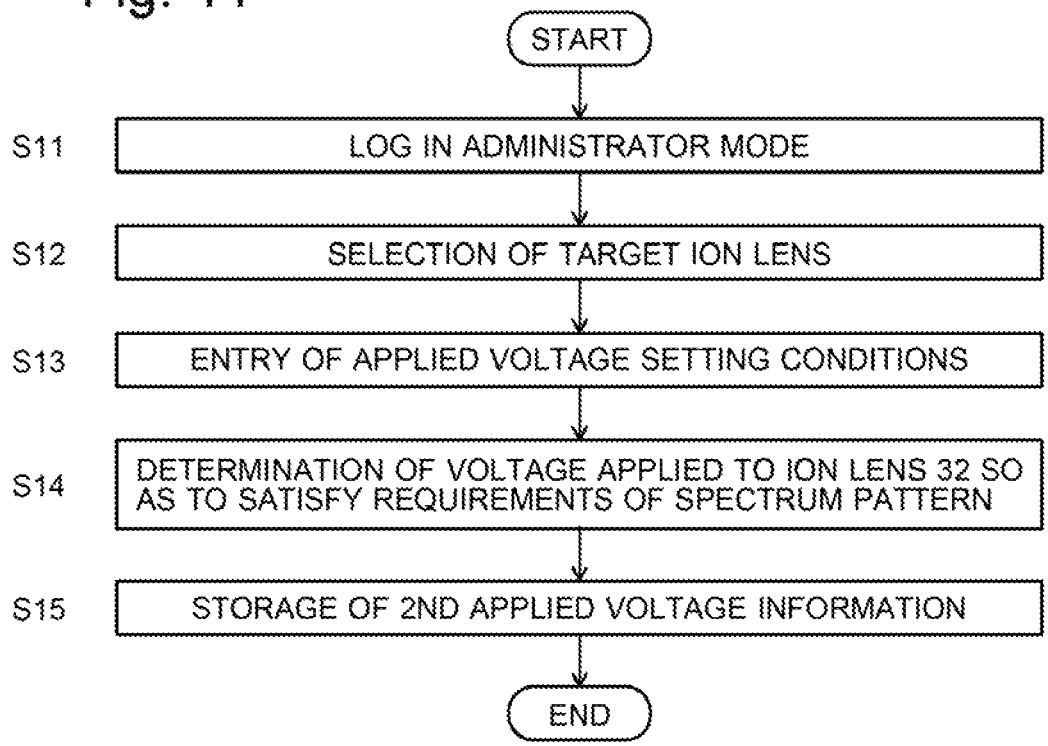
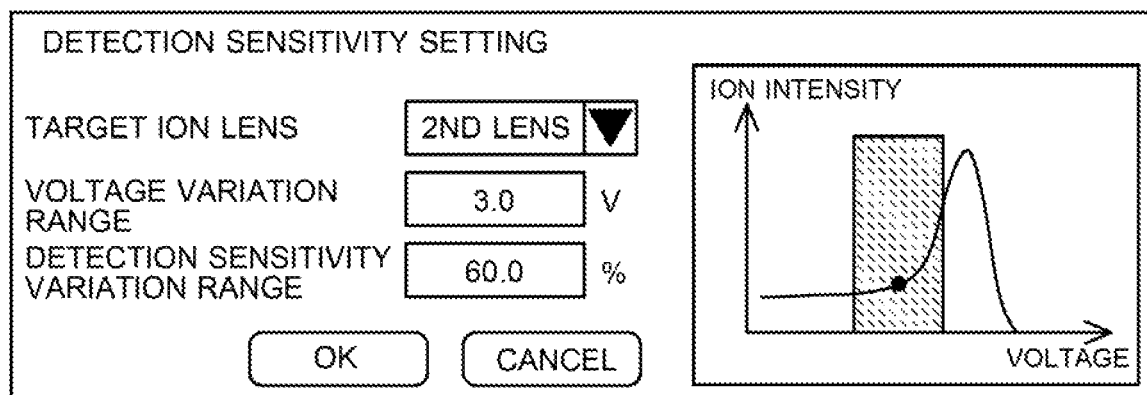

MASS SPECTROMETER AND MASS SPECTROMETRY

CROSS REFERENCE TO RELATED APPLICATIONS

This application is a National Stage of International Application No. PCT/JP2017/038459 filed Oct. 25, 2017.

TECHNICAL FIELD

The present invention relates to a mass spectrometer and mass spectrometric method.

BACKGROUND ART

Chromatograph mass spectrometers are one type of device for measuring the content of a compound in a sample. In a gas chromatograph mass spectrometer, which is one type of chromatograph mass spectrometer, a sample gas containing a compound as the target of the measurement is introduced into the column of the gas chromatograph. The compound which is the target of the measurement is thereby temporally separated from the other compounds and introduced into the mass spectrometer. In the mass spectrometer, the introduced measurement-target compound is ionized by electron ionization (EI) or other appropriate methods. The resulting ions are separated from each other according to their masses by a quadrupole mass filter or similar device, to be ultimately detected.

FIG. 1 shows a configuration example of the ion source used in a gas chromatograph mass spectrometer and the ion optical system located on the rear side of the ion source. In this gas chromatograph mass spectrometer, the compound which has been isolated as the measurement target by the column of the gas chromatograph and introduced into an ionization chamber 110 is ionized through collision with thermions generated from a filament 11 and injected into the ionization chamber. The resulting ions are ejected through an ion ejection opening 110c by a repeller electrode 113 in the ionization chamber 110 (for example, see Patent Literature 1).

The ions ejected from the ionization chamber 110 are introduced into the ion optical system 120. The ion optical system 120 is used for converging the ions generated in the ionization chamber 110 and transporting them to a mass separator section. The ion optical system 120 has a plurality of ion lenses 121, 122 and 123. The ion lenses 121, 122 and 123 are ring-shaped electrodes arranged along an ion beam axis, which is the central axis of the flight path of the ions, with each electrode surrounding the ion beam axis. A voltage having a polarity opposite to the measurement-target ion, for example, is applied to the ion lens 121, whereby the ions are extracted from the ionization chamber 110. A voltage having the same polarity as the measurement-target ion, for example, is applied to the next ion lens 122, whereby the ions are decelerated and converged into an area near the ion beam axis. A voltage having a polarity opposite to the measurement-target ion, for example, is applied to the rearmost ion lens 123, whereby the ions converged into the area near the ion beam axis are accelerated toward the mass separator section.

FIG. 2 is a graph showing one example of the relationship between the voltage applied to one lens (ion lens 122) among the ion lenses forming the ion optical system 120 and the measured intensity (detection sensitivity) of the ion. FIG. 3 is a graph showing one example of the relationship between the voltage applied to the rearmost lens 123 in the ion optical system 120 and the measured intensity of the ion. As shown in those figures, a change in the magnitude of the voltage applied to an ion lens leads to a change in the measured intensity of the ion. This is due to the fact that the state of convergence of the ion changes depending on the voltage applied to the ion lens and causes a change in the transmissivity of the ion. In particular, as for the ion lens 122, a significant change in the measured intensity of the ion with respect to the applied voltage occurs in the vicinity of the peak of the measured intensity of the ion (at an applied voltage of V2), as shown in FIG. 2. The relationship between the magnitude of the voltage applied to an ion lens and the measured intensity of the ion also depends on the mass-to-charge ratio of the ion. With these factors considered, a preliminary measurement which includes changing the magnitude of the voltage applied to each of the ion lenses 121, 122 and 123 while measuring the intensity of the ion at a predetermined mass-to-charge ratio is performed to determine the magnitudes of the voltages to be applied to the ion lenses 121, 122 and 123 so that the measured intensity of the ion will be maximized (i.e. so that the ion detection sensitivity will be maximized). Many mass spectrometers have the autotuning function. When this function is executed, the preliminary measurement is performed, and the voltages applied to the ion lenses 121, 122 and 123 are automatically adjusted to the aforementioned voltages.

Gas chromatograph mass spectrometers are used for the measurements of environmental pollutants. Many countries have measurement criteria specified for such measurements of the environmental pollutants. For example, the United States Environmental Protection Agency (EPA) specifies the requirements concerning the spectrum pattern for the measurement of the contents of environmental pollutants or other target compounds using a gas chromatograph mass spectrometer. Specifically, it is required that the ion detection sensitivity should be adjusted so that a plurality of characteristic ions originating from a specific reference substance and having different mass-to-charge ratios will be detected at an intensity ratio which falls within a previously specified range (i.e. so that a predetermined spectrum pattern will be obtained).

In the autotuning function, as described earlier, the voltages to be applied to the plurality of ion lenses forming the ion optical system are determined so that the measured intensity of the ion at a predetermined mass-to-charge ratio will be maximized. Since the voltages determined in this manner are unrelated to the criteria on the spectrum pattern, it is possible that the obtained spectrum pattern does not satisfy the aforementioned measurement criteria. In such a case, the autotuning function should not be used, and the voltages applied to the ion lenses 121, 122 and 123 should be adjusted according to the individual criteria so that the predetermined spectrum pattern will be obtained (for example, see Patent Literature 1). For example, the voltages applied to the ion lenses 121 and 122 are adjusted so as to increase (or typically, to maximize) the measured intensity of all ions, while the voltage applied to the ion lens 123 is adjusted so as to lower the detection sensitivity for an ion having a specific mass-to-charge ratio.

Using mass spectrometers of different manufacturers or different models may lead to different spectrum patterns obtained for the same compound due to a difference in detection sensitivity for each mass-to-charge ratio of the ion. Consider the case of the spectrum matching in which the degree of matching between a mass spectrum acquired for an unknown compound and a mass spectrum of a known compound recorded in a database is determined to identify the unknown compound. If the ion detection sensitivity of the mass spectrometer used for acquiring mass spectra recorded in the database is different from that of the mass spectrometer used for the measurement of the unknown compound, a mass peak which emerges at the same position (mass-to-charge ratio) will be detected with different intensities, which leads to a low degree of matching and consequently deteriorates the identification accuracy of the unknown compound. In order to accurately identify an unknown sample, the magnitudes of the voltages applied to the ion lenses in the mass spectrometer used for the measurement of the unknown sample should be adjusted so that the same spectrum pattern as obtained with the mass spectrometer used for acquiring the mass spectra recorded in the database will be acquired.

CITATION LIST

Patent Literature

Patent Literature 1: JP 2005-274352 A

SUMMARY OF INVENTION

Technical Problem

After the voltages applied to the ion lenses forming the ion optical system have been adjusted by the conventional method in the previously described manner in order to obtain a predetermined spectrum pattern, when the measurement of a target compound in a sample gas is performed, the ion detection sensitivity may possibly change with time (i.e. a sensitivity drift may occur).

Although the description so far has been concerned with the example of a gas chromatograph mass spectrometer, a similar problem also occurs in a liquid chromatograph mass spectrometer as well as a mass spectrometer which does not employ any chromatograph.

The problem to be solved by the present invention is to provide a mass spectrometer and mass spectrometric method which can reduce the sensitivity drift which may occur when the voltages applied to the ion optical system are adjusted so that the detection sensitivity for an ion having a predetermined mass-to-charge ratio will satisfy a previously specified requirement.

Solution to Problem

The present invention developed for solving the previously described problem provides a mass spectrometric method including the steps of transporting ions generated in an ion source to a mass spectrometer section through an ion optical system having a plurality of ion lenses, and detecting the ions after performing mass separation of the ions, the mass spectrometric method further including the steps of:

adjusting a voltage applied to a first ion lens which is one of the plurality of ion lenses so that a detection sensitivity for an ion having a predetermined mass-to-charge ratio satisfies a previously specified requirement; and applying, to a second ion lens which is one of the plurality of ion lenses except the first ion lens, a voltage at which the change in the ion detection sensitivity with respect to the voltage applied to the second ion lens is within a previously specified range.

That the "detection sensitivity for an ion having a predetermined mass-to-charge ratio satisfies a previously specified requirement" means, for example, maximizing the detection sensitivity for an ion having a predetermined mass-to-charge ratio, or setting the detection sensitivity for an ion having a predetermined mass-to-charge ratio so that a predetermined spectrum pattern will be obtained. The "voltage at which the change in the ion detection sensitivity with respect to the voltage applied to the second ion lens is within a previously specified range" means a voltage determined so that a change in the ion detection sensitivity for a displacement of the actually applied voltage from the set voltage (e.g., for a displacement of ±1.5 V, i.e. within a range of 43V) is limited to a previously specified range (e.g. the change in the ion detection sensitivity is equal to or less than 60%). The voltage should preferably be a voltage which maximizes the ion detection sensitivity within a voltage range that satisfies the requirement. Although the magnitude of such a voltage depends on the configuration of the ion optical system and other factors, the magnitude can be determined based on the characteristics of a change in the ion detection sensitivity with respect to the applied voltage obtained by a preliminary experiment or simulation, for example.

The first ion lens is typically the rearmost ion lens (located on the side facing the mass separator section), although any of the other ion lenses may be chosen. The second ion lens is typically the ion lens located next to the first ion lens, although any of the other ion lenses may be chosen.

In the conventional case of adjusting the voltages applied to the ion lenses so that the detection sensitivity for an ion having a predetermined mass-to-charge ratio satisfies a previously specified requirement, the voltage applied to one of the plurality of ion lenses forming the ion optical system is adjusted so that the detection sensitivity for an ion having a predetermined mass-to-charge ratio will satisfy a previously specified requirement, while the voltages applied to the other ion lenses are determined so that the ion detection sensitivity will be maximized. The present inventors have considered that the sensitivity drift occurs due to the fact that the voltages applied to the latter group of ion lenses are determined so as to maximize the ion detection sensitivity, so that the ion detection sensitivity responsively changes in the vicinity of those voltages (near the peak top).

In the mass spectrometric method according to the present invention, the voltage applied to the first ion lens, which is one of the plurality of ion lenses forming the ion optical system, is adjusted so that the detection sensitivity for an ion having a predetermined mass-to-charge ratio satisfies a previously specified requirement, while the voltage applied to the second ion lens is a voltage at which the change in the ion detection sensitivity with respect to the voltage applied to the second ion lens is confined within a previously specified range. For example, in the case of the aforementioned ion lens having the characteristics as shown in FIG. 2, the change in the ion detection sensitivity for a specific amount of change in the applied voltage (e.g. a 10% change) decreases with an increase in the distance from the peak top. Accordingly, even if the electric field created by the second ion lens is affected by a change of the electric field created by the first ion lens during the measurement, the ion detection sensitivity undergoes only an insignificant change. Thus, the sensitivity drift is reduced.

The mass spectrometric method according to the present invention is particularly effective in a measurement in which the "previously specified requirement" is the acquisition of a predetermined spectrum pattern, and the voltage applied to the first ion lens is adjusted so that the detection sensitivity for an ion having a predetermined mass-to-charge ratio is lower than the highest detection sensitivity obtained by changing the voltage applied to the first ion lens. In such a case, the ion transmission characteristics of the electric field created by the first ion lens are different from those of the electric field created by the second ion lens, which means that a change of the electric field created by one ion lens is likely to affect the electric field created by the other ion lens, so that the sensitivity drift particularly easily occurs if a conventional method is used.

A mass spectrometer according to the present invention developed for solving the previously described problem includes:

a) an ion source;

b) an ion optical system located on the rear side of the ion source, the ion optical system having a plurality of ion lenses including a first ion lens and a second ion lens;

c) a mass separator section located on the rear side of the ion optical system;

d) a detector section configured to detect an ion exiting from the mass separator section;

e) a voltage-applying section configured to apply voltages to the first ion lens and the second ion lens, respectively; and f) a control section configured to control the voltage-applying section so that a voltage at which the detection sensitivity for an ion having a predetermined mass-to-charge ratio in the detector section satisfies a previously specified requirement is applied to the first ion lens, while a voltage at which the change in the ion detection sensitivity with respect to the voltage applied to the second ion lens is within a previously specified range is applied to the second ion lens.

The tuning of the voltage-applying section by the control section can be achieved by performing a preliminary measurement which includes detecting an ion having a predetermined mass-to-charge ratio exiting from the ion optical system while gradually changing the voltages applied to the first and second ion lenses. Alternatively, the tuning can also be performed by referring to a storage section which holds "applied voltage information", which is a set of information representing the relationship between the ion detection sensitivity and the voltages applied to the first and second ion lenses. Such information can be prepared based on the result of the preliminary measurement mentioned earlier, or the result of a simulation.

Advantageous Effects of Invention

By using the mass spectrometric method or mass spectrometer according to the present invention, it becomes possible to reduce the sensitivity drift which may occur when the voltages applied to the ion optical system are adjusted so that the detection sensitivity for an ion having a predetermined mass-to-charge ratio will satisfy a previously specified requirement.

BRIEF DESCRIPTION OF DRAWINGS

FIG. 11 is a flowchart illustrating the procedure for entering the applied voltage setting conditions in an administrator mode in the present embodiment.

FIG. 12 is one example of the detection sensitivity setting screen displayed in the present embodiment.

DESCRIPTION OF EMBODIMENTS

Figure 4:
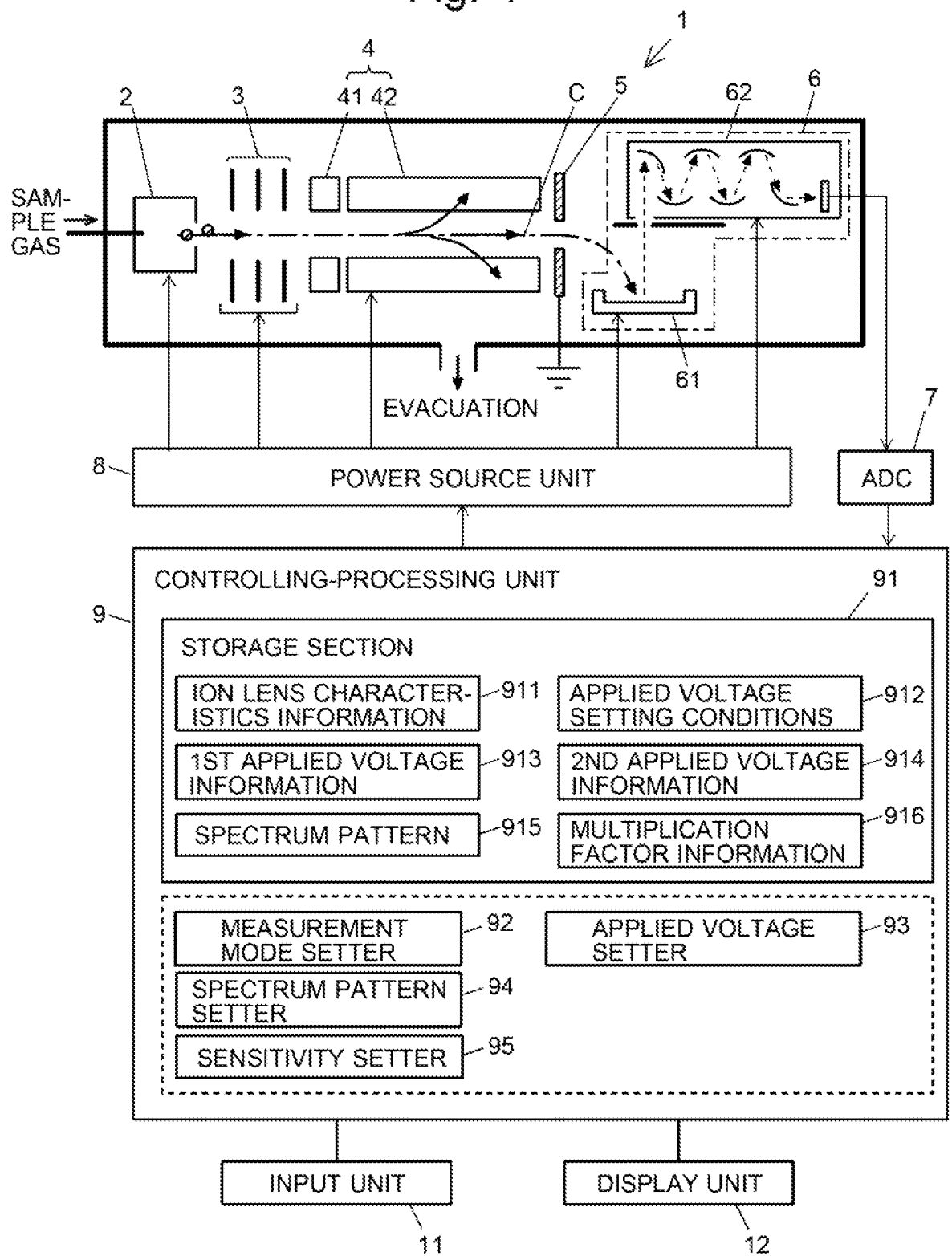
FIG. 4 is a schematic configuration diagram of one embodiment of the mass spectrometer according to the present invention.

One embodiment of the mass spectrometric method and mass spectrometer according to the present invention is hereinafter described with reference to the drawings. The mass spectrometer according to the present embodiment is a device in which a sample gas containing target components temporally separated from each other by a column of a gas chromatograph is ionized and subjected to a measurement. FIG. 4 schematically shows the configuration of the mass spectrometer 1 according to the present embodiment.

The mass spectrometer 1 according to the present embodiment roughly consists of an ion source 2, ion optical system 3, mass separator section 4, and detector section 6. The ion source 2 ionizes a sample gas which has been separated into components by a column of a gas chromatograph. The ion optical system 3 converges the ions generated by the ion source 2, and introduces them into the mass separator section 4. After being separated from each other by the mass separator section 4, the ions are detected in the detector section 6. Appropriate voltages are applied from a power source unit 8 to the ion source 2, ion optical system 3, mass separator section 4 and detector section 6 according to the control signals from a controlling-processing unit 9.

Figure 5:
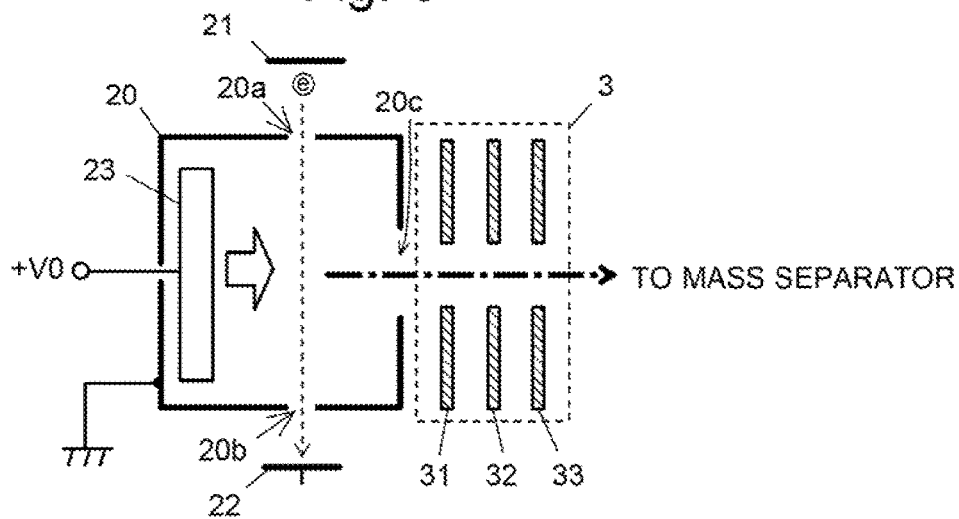
FIG. 5 is a configuration diagram of an ion source and ion optical system in the mass spectrometer according to the present embodiment.

FIG. 5 shows the configuration of the ion source 2 and ion optical system 3. The ion source 2, which is configured to ionize a sample gas by electron ionization (0), includes an ionization chamber 20, a filament 21 and trap electrode 22 between which the ionization chamber 20 is located, as well as a repeller electrode 23 located within the ionization chamber 20. The ionization chamber 20 has a thermion injection opening 20a through which the thermions generated from the filament 21 enters the chamber, a thermion exit opening 20b through which the thermions exit the chamber, and an ion ejection opening 20c through which the ions generated within the ionization chamber 20 are ejected.

The sample gas is introduced into the ionization chamber 20 in the direction perpendicular to the drawing sheet of FIG. 5. The introduced gas is ionized due to the collision with the thermions released from the filament 21 and entering the ionization chamber 20 through the thermion injection opening 20a. The ions generated within the ionization chamber 20 are ejected from the ion ejection opening 20c by being pushed away from the repeller electrode 23 by the electric field created within the ionization chamber 20 by applying a direct voltage (V0) having the same polarity as the ions to the repeller electrode 23.

The ions ejected from the ionization chamber 20 are introduced into the ion optical system 3. The ion optical system 3 has a plurality of ion lenses 31, 32 and 33 arrayed along an ion beam axis which is the central axis of the flight path of the ions, with each ion lens surrounding the ion beam axis.

The ions exiting from the ion optical system 3 are introduced into the mass separator section 4. The mass separator section 4 in the present embodiment is a quadrupole mass filter formed by pre-rods 41 and main rods 42. An appropriate radio-frequency voltage (and a direct voltage, as needed) is applied to the mass separator section 4 so as to selectively allow only an ion having a predetermined mass-to-charge ratio to pass through among the ions introduced into the mass separator section 4.

The ion which has passed through the mass separator section 4 enters the detector section 6 through an ion passage opening formed in a grounded aperture electrode 5.

The detector section 6 has a conversion dynode 61 and secondary electron multiplier tube 62. A voltage having a polarity opposite to the measurement-target ion is applied to the conversion dynode 61. The ion which has passed through the ion passage opening strikes the conversion dynode and gives rise to an emission of secondary electrons. The emitted secondary electrons are drawn into and multiplied by the secondary electron multiplier tube 62, and a detection signal corresponding to the number of electrons is produced. The detection signal from the detector section 6 is converted into digital data by an analogue-to-digital converter (ADC) 7 and sent to the controlling-processing unit 9.

The controlling-processing unit 9 includes, in addition to the storage section 91, a measurement mode setter 92, applied voltage setter 93, spectrum pattern setter 94 and sensitivity setter 95 as its functional blocks. The controlling-processing unit 9 is actually a personal computer, on which the aforementioned functional blocks are embodied by executing, on the computer, dedicated software installed on the same computer. An input unit 11 and display unit 12 are connected to the controlling-processing unit 9.

The storage section 91 holds the following items of information: the information representing the relationship between the ion detection sensitivity and the applied voltage for each of the ion lenses 31, 32 and 33 forming the ion optical system 3 (ion lens characteristics information 911); the conditions for the setting of the voltage applied to each ion lens (applied voltage setting condition 912); as well as two kinds of information concerning the magnitudes of the voltages applied to the ion lenses 31, 32 and 33 (first applied voltage information 913 and second applied voltage information 914).

The storage section 91 also holds the data of the spectrum patterns of the standard substances specified by the United States Environmental Protection Agency (EPA) or similar organizations and those of the spectrum patterns related to predetermined standard substances acquired with other mass spectrometers (spectrum patterns 915), as well as the information representing the relationship between the magnitude of the voltage applied to the secondary electron multiplier tube 62 and the multiplication factor of the secondary electrons (multiplication factor information 916).

The ion lens characteristics information 911 is prepared, for example, by a manufacturer of the mass spectrometer 1 according to the present embodiment based on the result of a preliminary experiment or simulation which includes gradually changing the magnitude of the voltage applied to each ion lens 31, 32 or 33 while measuring the intensities of a plurality of ions having different mass-to-charge ratios generated from predetermined standard substances.

The mass spectrometer 1 according to the present embodiment allows for the selective execution of either a normal mode which corresponds to a conventional autotuning mode or a spectrum pattern setting mode in which the ion detection sensitivity is adjusted so that a specific spectrum pattern will be obtained. The first applied voltage information 913 mentioned earlier is used in the normal mode, while the second applied voltage information is used in the spectrum pattern setting mode. The first applied voltage information 913 and second applied voltage information 914 are prepared based on the ion lens characteristics information 911 and applied voltage setting conditions 912, and stored in the storage section 91 on the shipment of the device. The applied voltage setting conditions 912, first applied voltage information 913, and second applied voltage information 914 can be modified in an administrator mode which an administrator of the device or a service person from the manufacturer can execute by logging in the device by a predetermined method. A description of the administrator mode will be given later.

The normal mode is a mode in which voltages are applied to the ion lenses 31, 32 and 33 so that the ion detection sensitivity will be maximized. This mode corresponds to the conventional autotuning mode. On the other hand, the spectrum pattern setting mode is a mode to be used in the case of adjusting the ion detection sensitivity in a measurement of the contents of environmental pollutants or other target compounds using a gas chromatograph mass spectrometer, in order to satisfy the requirements concerning the spectrum pattern specified by the United States Environmental Protection Agency (EPA) or similar organizations, or in order to adjust the ion detection sensitivity to that of a mass spectrometer of a different manufacturer or different model to allow for a comparison of mass spectrum data with those acquired with the latter mass spectrometer.

Figure 1:
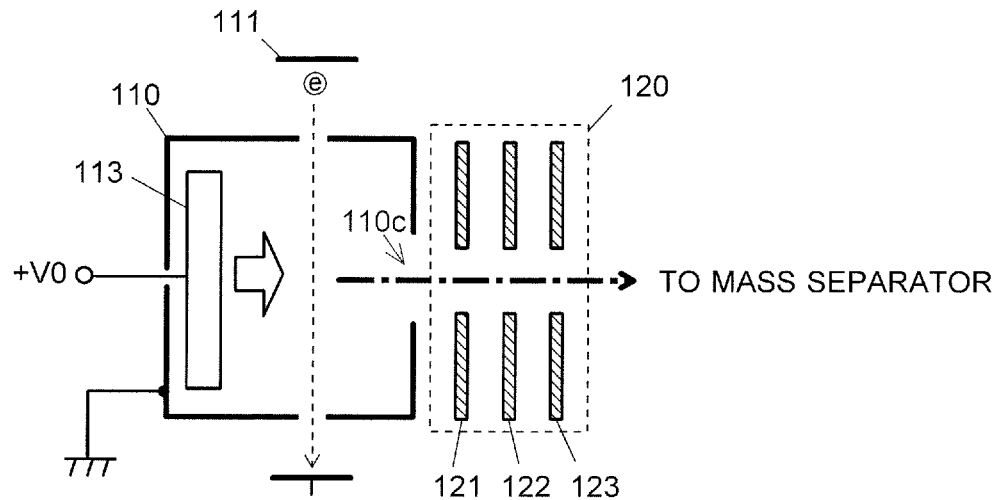
FIG. 1 is a configuration example of an ion source and ion optical system in a conventional gas chromatograph mass spectrometer.
Figure 2:
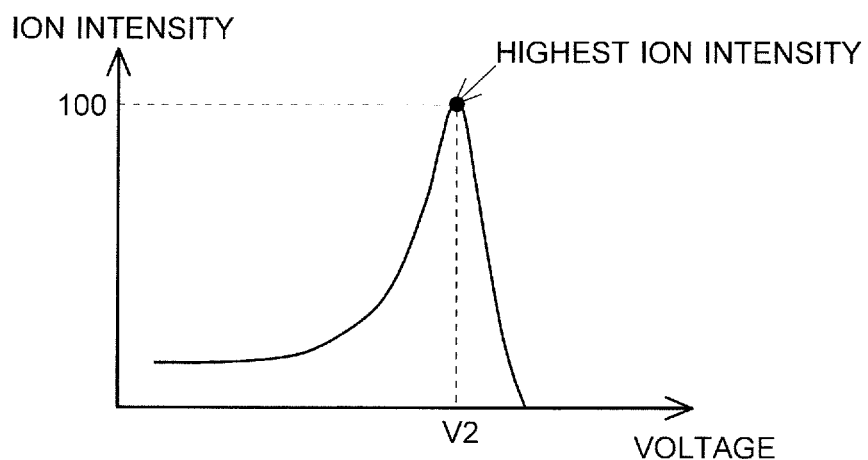
FIG. 2 is a graph showing a relationship between the voltage applied to an ion lens and the ion intensity.
Figure 3:
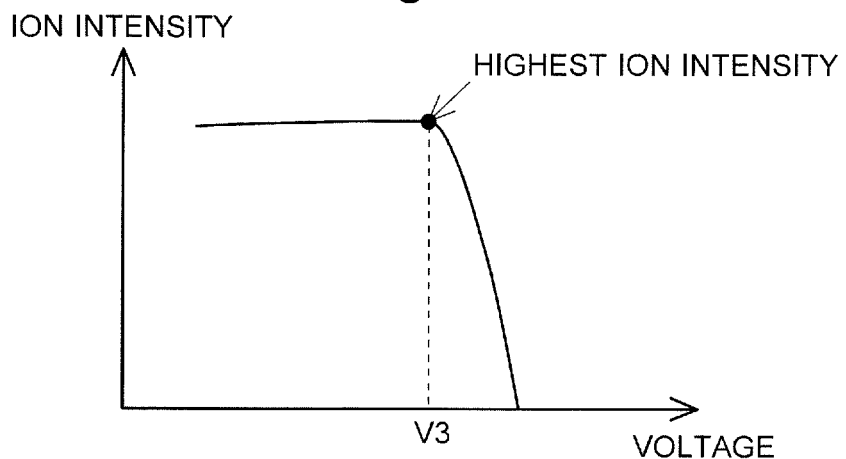
FIG. 3 is another graph showing a relationship between the voltage applied to an ion lens and the ion intensity.
Figure 6A:
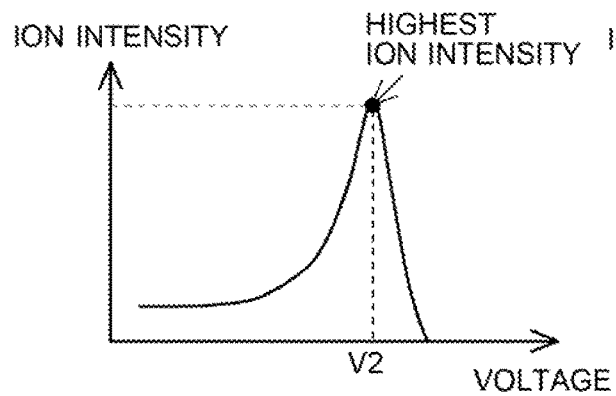
FIGS. 6A and 6B are diagrams illustrating the fact that the relationship between the voltage applied to an ion lens and the ion intensity changes depending on the voltage applied to another ion lens.
Figure 6B:
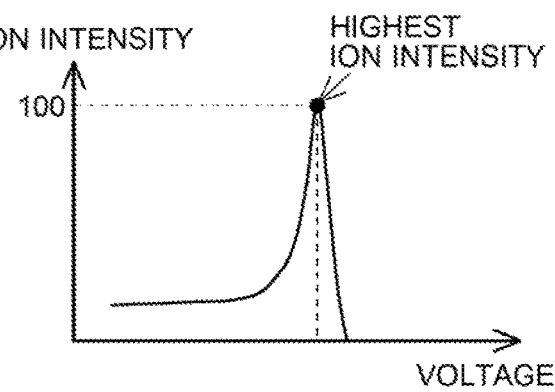
Figure 7A:
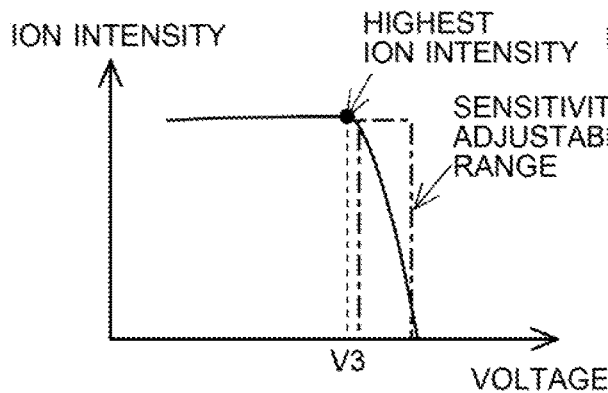
FIGS. 7A and 7B are another set of diagrams illustrating the fact that the relationship between the voltage applied to an ion lens and the ion intensity changes depending on the voltage applied to another ion lens.

The relationship between the ion detection sensitivity and the voltages applied to the ion lenses 32 and 33 is hereinafter described. FIG. 6A is a graph showing a change in the measured intensity of the ion with respect to the voltage applied to the ion lens 32 in the case where voltages which maximize the measured intensity (or detection sensitivity) of the ion are applied to the ion lenses 31 and 33. FIG. 7A is a graph showing a change in the measured intensity of the ion with respect to the voltage applied to the ion lens 33 in the case where voltages which maximize the measured intensity (or detection sensitivity) of the ion are applied to the ion lenses 31 and 32. FIGS. 6A and 6B as well as FIGS. 7A and 7B correspond to the ion lens characteristics information 911. Such a set of data representing the relationship between the applied voltage and the ion detection sensitivity is stored for each of a plurality of mass-to-charge ratios as well as for each of the ion lenses 31, 32 and 33. It should be noted that FIG. 6A is a reproduction of FIG. 2, while FIG. 7A is a reproduction of FIG. 3.

The first applied voltage information 913 specifies the applied voltages to be used in the normal mode aimed at maximizing the ion detection sensitivity. Therefore, voltage V2 as the voltage to be applied to the ion lens 32 and voltage V3 to be applied to the ion lens 33 are saved in this information. Voltage V1 for the ion lens 31 is also similarly saved.

The second applied voltage information 914 specifies voltages which yield an ion detection sensitivity corresponding to a specific spectrum pattern specified by a user. A description of the second applied voltage information 914 is as follows.

It is often the case that the spectrum pattern for the mass peaks on a mass spectrum is specified by the intensity ratio of each peak relative to the peak having the highest intensity (base peak). In that case, the intensity ratio of each mass peak must be within a specific range. Suppose a spectrum in which the peak intensity of an ion of mass-to-charge ratio (m/z) A having the highest peak intensity is defined as 100%, with an ion of mass-to-charge ratio B having a peak intensity of 90% and an ion of mass-to-charge ratio C having a peak intensity of 75%. For this spectrum, it is required, for example, that the ion of mass-to-charge ratio B should be detected with an intensity within a range of 80 to 100%, while the ion of mass-to-charge ratio C should be within a range of 65 to 85%.

Figure 8A:
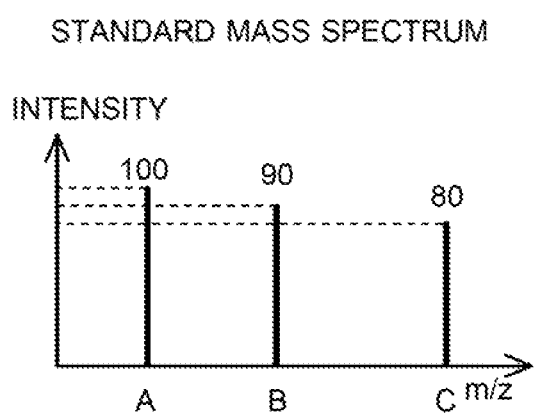
FIGS. 8A and 8B are diagrams illustrating the spectrum pattern of a standard mass spectrum and that of a mass spectrum acquired by a conventional autotuning method.
Figure 8B:
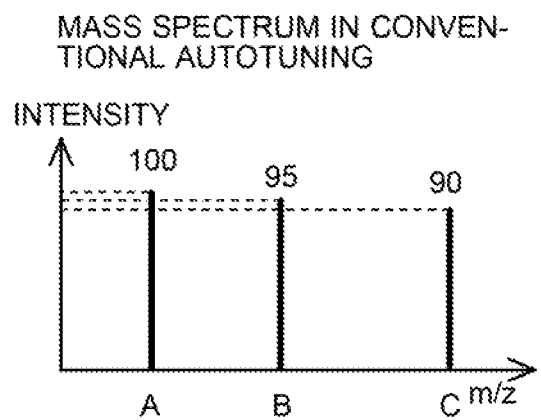

For example, in the case of a measurement which should satisfy the requirements concerning the spectrum pattern specified by the United States Environmental Protection Agency (EPA), maximizing the ion detection sensitivity by the conventional autotuning function (which corresponds to the normal mode in the present embodiment) often causes the detection sensitivity for ions having large mass-to-charge ratios to be excessively high, with the result that the intensities of the mass peaks of the ions of large mass-to-charge ratios become excessively high for the required spectrum pattern. For example, for a previously specified spectrum pattern (FIG. 8A) in which the mass peaks of ion 1 (mass-to-charge ratio A), ion 2 (mass-to-charge ratio B) and ion 3 (mass-to-charge ratio C) respectively have intensity ratios of 100, 90 and 75, a measurement using a mass spectrometer which has been autotuned by the conventional method may possibly yield the mass peaks of those ions having intensity ratios of 100, 95 and 90 (FIG. 8B). In that case, the detection sensitivity for ion 3 (mass to-charge ratio C) must be lowered. A conventional method for dealing with this case is to increase the voltage applied to the ion lens 33 whose characteristics are as shown in FIG. 7A, to a level higher than the voltage which maximizes the ion detection sensitivity, so as to lower the ion detection sensitivity and thereby obtain the predetermined spectrum pattern. As with the ion lens 33 in the present embodiment, if the change in the ion detection sensitivity within a voltage range lower than the voltage which maximizes the detection sensitivity is too small to perform the adjustment to the predetermined spectrum pattern, it has been common to perform the adjust the detection sensitivity within a voltage range higher than the voltage which maximizes the detection sensitivity where the change in the ion detection sensitivity for a change in applied voltage is comparatively large (this range corresponds to the "sensitivity adjustable range" in FIG. 7A).

The electric field created by the ion lens 33 also affects the electric field created by the ion lens 32 located next to the ion lens 33. Therefore, a change in the voltage applied to the ion lens 33 leads to a change in the relationship between the voltage applied to the ion lens 32 and the measured intensity (detection intensity) of the ion. When the voltage applied to the ion lens 33 is changed to a level higher than the voltage which maximizes the ion detection sensitivity, a shift occurs in the peak position of the ion detection sensitivity with respect to the voltage applied to the ion lens 32, as shown in FIG. 6B. Additionally, the shape of the peak top becomes sharper. Therefore, in the conventional method, a significant change in the measured intensity (detection sensitivity) of the ion with respect to the applied voltage occurs within a range near the peak of the measured intensity (measurement sensitivity) of the ion, so that the sensitivity drift easily occurs.

In FIG. 6B, the change in the measured intensity (detection sensitivity) of the ion with respect to the applied voltage is either gentle as in FIG. 6A, or practically zero, at positions distant from the peak (low-voltage side). Accordingly, in the mass spectrometer 1 according to the present embodiment, the requirement that the change in the ion detection sensitivity for a change of ±1.5 V (within a range of 43V) in the voltage applied to the ion lens 32 should be equal to or less than 60% is specified as the applied voltage setting condition 912, and the second applied voltage information 914 which satisfies this condition is used. This reduces the sensitivity drift which may occur when the electric field created near the ion lens 32 is changed for some reason, such as the adhesion of a substance to the ion lens 32 in the middle of the measurement.

Figure 7B:
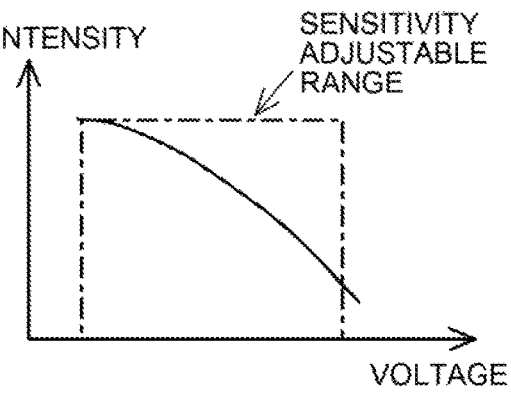

A change in the voltage applied to the ion lens 32 leads to a change in the relationship between the measured intensity (detection intensity) of the ion and the voltage applied to the ion lens 33 located next to the ion lens 32. Specifically, as shown in FIG. 7B, the change in the ion detection sensitivity becomes gentler with an increase in the applied voltage. As compared to the graph of FIG. 7A in which the applied voltage adjustable for obtaining a predetermined level of the ion detection sensitivity is limited to a narrow range, the adjustable range of the applied voltage is significantly widened in FIG. 7B. Furthermore, the change in the measured intensity (detection sensitivity) of the ion for a change in the applied voltage is reduced. Thus, two advantages, i.e. the reduction of the sensitivity drift and the widening of the adjustable range of the voltage applied to the ion lens 33, can be simultaneously obtained by setting the voltage applied to the ion lens 32 so that the change in the ion detection sensitivity for a change (43V) in the voltage applied to the ion lens 32 will be within a previously specified range (equal to or less than 60%) as in the present embodiment.

Figure 9:
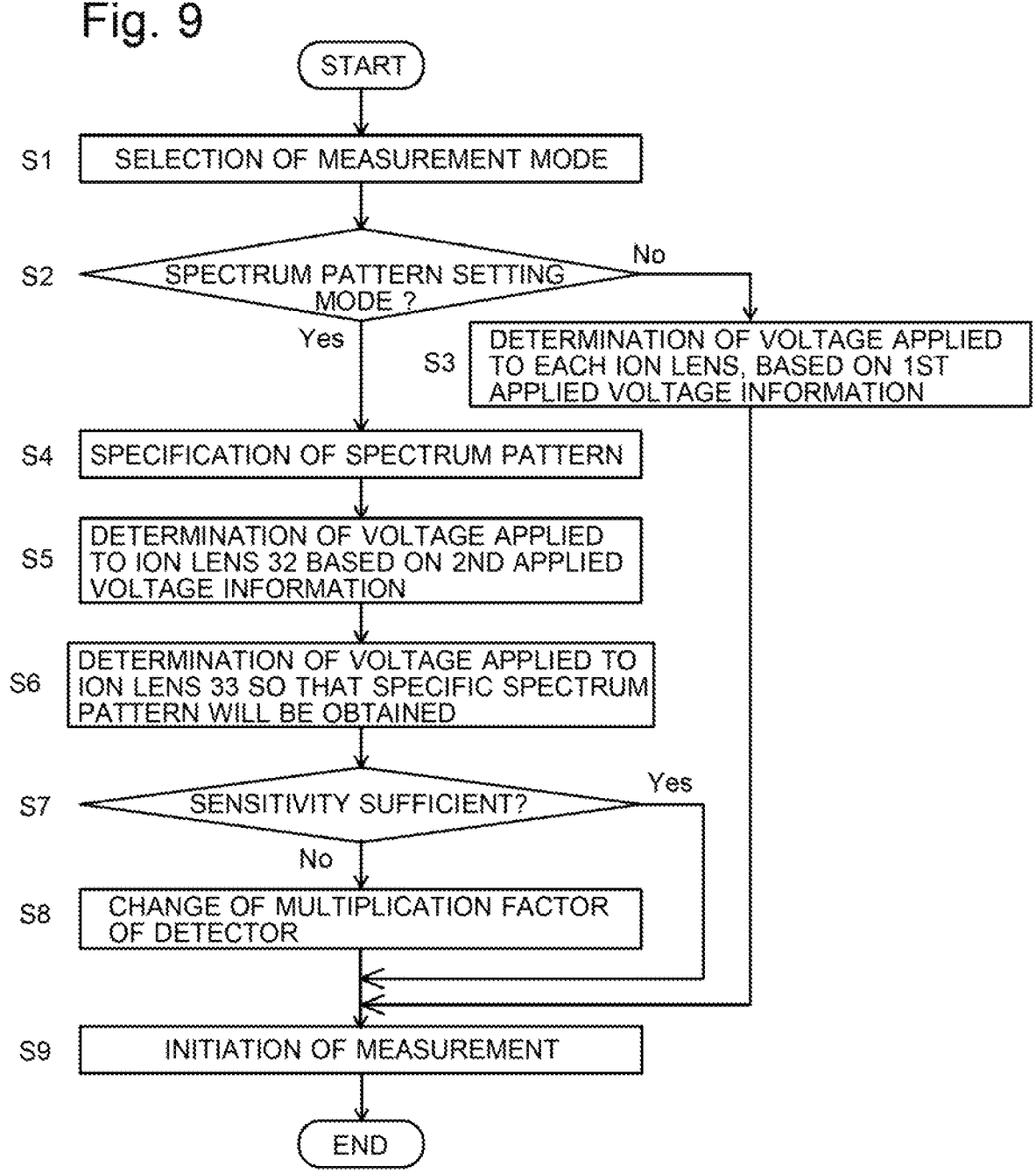
FIG. 9 is a flowchart concerning one embodiment of the mass spectrometric method according to the present invention.

A procedure of the measurement using the mass spectrometer according to the present embodiment is hereinafter described with reference to the flowchart of FIG. 9 and other related drawings.

Figure 10:
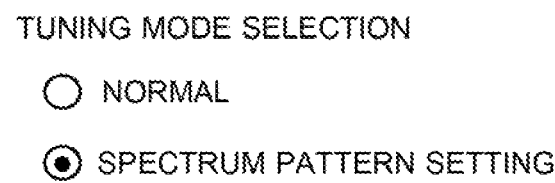
FIG. 10 is one example of the measurement mode selection screen displayed in the present embodiment.

A user issues a command through the input unit 11 to initiate an analysis of a sample. Then, the measurement mode setter 92 displays a measurement mode selection screen as shown in FIG. 10 on the screen to allow the user to select either the normal mode or spectrum pattern setting mode (Step S1). The normal mode is a mode to be used for common types of measurements. This mode corresponds to the conventional autotuning mode. The spectrum pattern setting mode is a mode in which the ion detection sensitivity is adjusted for each relevant mass-to-charge ratio so that the predetermined spectrum pattern will be obtained.

If the normal mode is selected by the user ("No" in Step S2), the applied voltage setter 93 sets the magnitude of the applied voltage for each of the ion lenses 31, 32 and 33 based on the first applied voltage information 913 stored in the storage section 91 (Step S3). When a command from the user is issued, the measurement is initiated (Step S9).

If the spectrum pattern setting mode is selected by the user ("Yes" in Step S2), the spectrum pattern setter 94 prompts the user to specify one of the spectrum patterns stored in the storage section 91 (Step S4). If the desired spectrum pattern is not stored in the storage section 91, the user can specify the spectrum pattern by entering a plurality of values of the mass-to-charge ratio as well as the detection sensitivity for the ions having those mass-to-charge ratios (i.e. a set of information equivalent to the spectrum pattern).

After the spectrum pattern has been specified by the user, the applied voltage setter 93 sets the magnitude of the voltage to be applied to the ion lens 32 based on the second applied voltage information 914 stored in the storage section 91 (Step S5). As for the ion lens 31, the applied voltage is set so that the ion detection sensitivity will be maximized.

After the voltages to be applied to the ion lenses 31 and 32 have been determined, the applied voltage setter 93 subsequently refers to the ion lens characteristics information 911 and determines the voltage to be applied to the ion lens 33 so that the spectrum pattern specified by the user will be obtained (Step S6).

After the voltages to be respectively applied to the ion lenses 31, 32 and 33 have been determined, the sensitivity setter 95 prompts the user to input judgment on whether or not the ion detection sensitivity under the previously described setting of the spectrum pattern is sufficient. If the judgment inputted by the user is such that the ion detection sensitivity is sufficient ("Yes" in Step S7), the sensitivity setter 95 sets the magnitude of the voltage applied to the secondary electron multiplier tube 62 at its prescribed value (which is the same as used in the normal mode). If the judgment inputted by the user is such that the ion detection sensitivity is insufficient ("No" in Step S7), the sensitivity setter 95 sets the magnitude of the voltage applied to the secondary electron multiplier tube 62 at a higher level than the prescribed value. That is to say, the multiplication factor of the secondary electrons in the secondary electron multiplier tube 62 is increased to increase the detection sensitivity (Step S8). Specifically, based on the multiplication factor information 916 stored in the storage section 91, the voltage is increased so that the ion detection sensitivity during the measurement will be comparable to the ion detection sensitivity which will be obtained when the voltages are applied as in the normal mode. For example, when the ion detection sensitivity under the previously described setting of the spectrum pattern is one half of the value in the normal mode, the multiplication factor should be set at two. That is to say, if the user has set the ion detection sensitivity at X % of the highest value, a voltage which yields a multiplication factor of 100/X should be applied to the secondary electron multiplier tube 62. The example described so far has been concerned with the case of changing the multiplication factor so that the ion detection sensitivity will be comparable to the ion detection sensitivity in the normal mode. It is also possible to prepare another reference value concerning the ion detection sensitivity and change the multiplication factor based on that reference value.

An increase in the detection sensitivity can also be achieved by increasing the voltage applied to the conversion dynode 61. However, changing the magnitude of the voltage applied to the conversion dynode 61 may possibly change the spectrum pattern, since the relationship between the voltage applied to the conversion dynode 61 and the amount of generated secondary electrons depends on the mass-to-charge ratio of the ion incident on the conversion dynode 61. Accordingly, it is preferable to recover the detection sensitivity by changing the voltage applied to the secondary electron multiplier tube 62 as in the present embodiment.

In the present embodiment, the user is prompted to input judgment on whether or not the detection sensitivity is sufficient. It is also possible to previously store, in the storage section 91, a reference value (e.g. ion intensity value) for determining whether or not the detection sensitivity for a predetermined ion is sufficient, and configure the sensitivity setter 95 to automatically adjust the voltage applied to the secondary electron multiplier tube 62 based on that reference value (ion intensity value).

After the voltage applied to the secondary electron multiplier tube 62 has been set by the sensitivity setter 95, the measurement is initiated when a predetermined operation is performed by the user through the input unit 11 (Step S9). After the initiation of the measurement, the operation is similar to the conventional one, and therefore, no detailed descriptions of the operation will be given. The detection signals generated from the detector section 6 during the measurement are converted into digital signals by the analogue-to-digital converter 7 and sequentially stored in the storage section 91.

A description of the administrator mode is hereinafter given with reference to FIGS. 11 and 12.

An administrator of the device or a service person from the manufacturer (this person is also hereinafter called an "administrator") logs in the administrator mode (Step S11). Then, the applied voltage setter 93 displays an input screen of the applied voltage setting conditions as shown in FIG. 12 on the display unit 12. When the administrator mode is executed for the first time, the applied voltage setting conditions 912 entered on the shipment of the mass spectrometer 1 are displayed. From the second time on, the applied voltage setting conditions 912 entered the last time are displayed.

The applied voltage setting conditions 912 include three items: the target ion lens, voltage variation range, and detection sensitivity variation range. The "target ion lens" is the item which determines the ion lens to be used for reducing the sensitivity drift. One of the three ion lenses 31, 32 and 33 forming the ion optical system 3 is selected by the pull-down list (Step S12). Upon selection of the target ion lens, a graph which shows the characteristics of the ion lens (characteristics graph) is displayed on the screen.

The voltage variation range is the item for specifying the variation range of the voltage applied to the target ion lens. The detection sensitivity variation range is the item for specifying the allowable range of the variation in detection sensitivity for a variation of the voltage applied to the target ion lens within the aforementioned range.

After the voltage variation range and detection sensitivity variation range have been entered by the administrator (Step S13), the applied voltage setter 93 searches the ion lens characteristics information 911 for a voltage range which satisfies the entered requirements, and determines the voltage which maximizes the detection sensitivity within that voltage range (Step S14). Additionally, the applied voltage setter 93 displays, on the characteristics graph of the target ion lens, the voltage which satisfies the entered conditions (the filled dot in FIG. 12) and the voltage variation range centered on this voltage. Such a display allows the administrator to recognize the voltage which satisfies the entered applied voltage setting conditions on the characteristics graph. The administrator visually checks the display and presses the OK button. Upon this operation, the applied voltage setter 93 stores the second applied voltage information 914 in the storage section 91 (Step S15).

The previously described embodiment is an example and can be appropriately changed within the spirit of the present invention.

The applied voltage setting conditions in the previously described embodiment (i.e. the requirement that the change in the ion detection sensitivity for a change in the voltage applied to the ion lens 32 by ±1.5 V, i.e. within a range of 43V, should be equal to or less than 60%), have been determined by the present inventors based on the result of a simulation performed for a specific configuration of the mass spectrometer, as well as the result of an experiment using those conditions, which demonstrated that the variation in ion intensity was reduced to approximately 20% in an analysis continued for 48 hours, and a sufficient degree of stability could be ensured. The specific numerical values naturally change depending on the configuration of the mass spectrometer (particularly, the configuration of the ion optical system). Accordingly, the details of the applied voltage setting conditions should be appropriately determined depending on the used mass spectrometer.

The previously described embodiment is concerned with a gas chromatograph mass spectrometer configured to perform a mass spectrometric analysis on a sample introduced from a column of a gas chromatograph. A similar configuration can also be applied in a liquid chromatograph mass spectrometer as well as a mass spectrometer which does not employ any chromatograph. The quadrupole mass filter used as the mass separator section 4 and the secondary electron multiplier used as the detector section 6 in the previous embodiment are also mere examples and may be replaced by appropriate types of devices (e.g. a time-of-flight type of mass separator section) according to the aim of the measurement and other factors. The ion detection sensitivity can be recovered by setting the multiplication factor according to the type of used detector.

As opposed to the previously described embodiment in which the numerical values related to the voltage variation range and detection sensitivity variation range are entered in the administrator mode, the device may be configured to allow the administrator to select a desired range on the characteristics graph displayed on the screen, with the applied voltage setter 93 configured to read the numerical values of the voltage variation range and detection sensitivity variation range corresponding to the selected range, and automatically enter the two items of values. In place of the voltage variation range and detection sensitivity variation range, the amount of change in the ion detection sensitivity with respect to the applied voltage (i.e. the gradient of the graph shown in FIGS. 6A and 6B) may be entered, in which case the voltage which gives the highest ion detection sensitivity within the voltage range where the amount of change (gradient) is equal to or less than the entered value can be used as the second applied voltage information 914.

In the previously described embodiment, the adjustment of the ion detection sensitivity is performed only in the spectrum pattern setting mode. The adjustment of the ion detection sensitivity may also be performed in the normal mode according to an instruction from the user. Specifically, the device may be configured to set the applied voltage for at least one of the ion lenses 31, 32 and 33 so that the ion detection sensitivity obtained for the ion lens concerned will be lower than its highest value, and therefore, the variation in the ion detection sensitivity with respect to the applied voltage will be smaller.

In the previously described embodiment, the applied voltages are determined so that a predetermined spectrum pattern will be obtained by adjusting the voltage applied to the ion lens 33, while the voltage applied to the ion lens 32 is determined so that the ion detection sensitivity will be lower than its highest value. A combination different from the ion lenses 33 and 32 may be used for those adjustments. As for the determination of the magnitude of the voltage applied to each ion lens, a preliminary measurement may be performed each time, and the voltage to be applied may be determined based on the measured result, instead of using the applied voltage information stored in the storage section as in the previous embodiment.

REFERENCE SIGNS LIST

1 . . . Mass Spectrometer
2 . . . Ion Source
20 . . . Ionization Chamber
20a . . . Thermion Injection Opening
20b . . . Thermion Exit Opening
20c . . . Ion Ejection Opening
21 . . . Filament
22 . . . Trap Electrode
23 . . . Repeller Electrode
3 . . . Ion Optical System
31, 32, 33 . . . Ion Lens
4 . . . Mass Separator Section
41 . . . Pre-Rod
42 . . . Main Rod
5 . . . Aperture Electrode
6 . . . Detector Section
61 . . . Conversion Dynode
62 . . . Secondary Electron Multiplier Tube
7 . . . Analogue-to-Digital Converter
8 . . . Power Source Unit
9 . . . Controlling-Processing Unit
91 . . . Storage Section
92 . . . Measurement Mode Setter
93 . . . Applied Voltage Setter
94 . . . Spectrum Pattern Setter
95 . . . Sensitivity Setter
11 . . . Input Unit
12 . . . Display Unit

The invention claimed is:

1. A mass spectrometric method including steps of transporting ions generated in an ion source to a mass spectrometer section through an ion optical system having a plurality of ion lenses, and detecting the ions after performing mass separation of the ions, the mass spectrometric method further comprising steps of:
   adjusting a voltage applied to a first ion lens which is one of the plurality of ion lenses so that a detection sensitivity for an ion having a predetermined mass-to-charge ratio satisfies a previously specified requirement; and
   applying, to a second ion lens which is one of the plurality of ion lenses except the first ion lens, a voltage at which a change in the ion detection sensitivity with respect to the voltage applied to the second ion lens is within a previously specified range.

2. The mass spectrometric method according to claim 1, wherein the previously specified requirement is acquisition of a predetermined spectrum pattern, and the voltage applied to the first ion lens is adjusted so that the detection sensitivity for an ion having a predetermined mass-to-charge ratio is lower than a highest detection sensitivity obtained by changing the voltage applied to the first ion lens.

3. A mass spectrometer, comprising:
   a) an ion source;
   b) an ion optical system located on a rear side of the ion source, the ion optical system having a plurality of ion lenses including a first ion lens and a second ion lens;
   c) a mass separator section located on a rear side of the ion optical system;
   d) a detector section configured to detect an ion exiting from the mass separator section;

e) a voltage-applying section configured to apply voltages to the first ion lens and the second ion lens, respectively; and f) a control section configured to control the voltage-applying section so that a voltage at which a detection sensitivity for an ion having a predetermined mass-to-charge ratio in the detector section satisfies a previously specified requirement is applied to the first ion lens, while a voltage at which the change in the ion detection sensitivity with respect to the voltage applied to the second ion lens is within a previously specified range is applied to the second ion lens.

4. The mass spectrometer according to claim 3, wherein the previously specified requirement is acquisition of a predetermined spectrum pattern, and the voltage applied to the first ion lens is adjusted so that the detection sensitivity for an ion having a predetermined mass-to-charge ratio is lower than a highest detection sensitivity obtained by changing the voltage applied to the first ion lens.

5. The mass spectrometer according to claim 3, wherein a detection signal in the detector section is amplified so as to recover the detection sensitivity for the ion lowered by adjustment of the voltage applied to the first ion lens.

* * * * *